US010827009B2

(12) United States Patent
Horn et al.

(10) Patent No.: US 10,827,009 B2
(45) Date of Patent: Nov. 3, 2020

(54) SYSTEMS AND METHODS FOR USE IN GEOLOCATION RESOLUTION OF COMPUTER NETWORK NODES

(71) Applicant: MASTERCARD INTERNATIONAL INCORPORATED, Purchase, NY (US)

(72) Inventors: Gary R. Horn, Leakey, TX (US); Kenneth L. Long, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 37 days.

(21) Appl. No.: 16/175,257

(22) Filed: Oct. 30, 2018

(65) Prior Publication Data

US 2020/0137178 A1 Apr. 30, 2020

(51) Int. Cl.
*H04L 29/08* (2006.01)
*G06Q 40/00* (2012.01)

(52) U.S. Cl.
CPC ............ *H04L 67/18* (2013.01); *G06Q 40/12* (2013.12); *H04L 67/12* (2013.01)

(58) Field of Classification Search
CPC . H04L 67/2857; H04L 67/12; H04L 61/1511; H04L 67/2833; H04L 67/10; G06F 15/00
USPC ....................................................... 709/223
See application file for complete search history.

(56) References Cited

U.S. PATENT DOCUMENTS

| 7,065,566 | B2* | 6/2006 | Menard ................ G06Q 30/06 709/223 |
| 8,131,690 | B2* | 3/2012 | Hoile ..................... G06F 7/00 707/694 |
| 10,038,968 | B2* | 7/2018 | Milton ................. H04W 4/029 |
| 2006/0074601 | A1* | 4/2006 | Hoiness ............... G01D 4/006 702/188 |
| 2008/0168004 | A1* | 7/2008 | Kagarlis ............... G06Q 40/06 705/36 R |

(Continued)

FOREIGN PATENT DOCUMENTS

WO  WO 2017/173263 A1 * 10/2017 ............. H04L 29/08

*Primary Examiner* — David R Lazaro
*Assistant Examiner* — Berhanu Shitayewoldetadik
(74) *Attorney, Agent, or Firm* — Harness, Dickey & Pierce, P.L.C.

(57) ABSTRACT

Disclosed are exemplary embodiments of systems and methods for use in assigning locations to network records. One exemplary system includes a processor coupled to a data structure including network records, each record including a network node identifier and a boundary identifier. The processor is configured to, for each boundary identifier, access each of the network records including the boundary identifier. The accessed records include reference and target network records. Each reference network record includes location data indicative of a location of the network node identified in the reference record within the boundary. The processor is configured to determine an aggregate location as a median of the location data for the network nodes identified in the reference network records and assign the aggregate location to each of the target network records as location data indicative of the location of each network node identified in the target records within the boundary.

19 Claims, 3 Drawing Sheets

(56) References Cited

U.S. PATENT DOCUMENTS

| | | | |
|---|---|---|---|
| 2010/0228657 A1* | 9/2010 | Kagarlis | G06Q 40/00 705/35 |
| 2013/0124263 A1* | 5/2013 | Amaro | G06Q 30/02 705/7.34 |
| 2014/0248038 A1* | 9/2014 | Holden | H04N 9/79 386/250 |
| 2015/0149432 A1* | 5/2015 | Hart | G06Q 40/00 707/708 |
| 2016/0210633 A1* | 7/2016 | Epelman | G06Q 20/4016 |
| 2016/0350769 A1* | 12/2016 | Venkatesh | G06Q 30/0201 |
| 2016/0371722 A1* | 12/2016 | Maginnis | G06Q 30/0261 |
| 2017/0039242 A1* | 2/2017 | Milton | G06Q 30/0269 |
| 2017/0364915 A1* | 12/2017 | Levy | H04L 67/42 |
| 2018/0020324 A1* | 1/2018 | Beauford | H04L 43/10 |
| 2018/0211322 A1* | 7/2018 | Lintner | G06Q 20/3829 |
| 2019/0147484 A1* | 5/2019 | Monaco | G06Q 30/0213 705/14.38 |
| 2019/0316897 A1* | 10/2019 | Yeh | H04N 5/247 |

* cited by examiner

SYSTEMS AND METHODS FOR USE IN GEOLOCATION RESOLUTION OF COMPUTER NETWORK NODES

FIELD

The present disclosure generally relates to systems and methods for use in geolocation resolution of computer network nodes, and in particular, to assigning location data to computer network nodes within boundaries based on multiple identified node locations within the boundaries.

BACKGROUND

This section provides background information related to the present disclosure which is not necessarily prior art.

Computer networks are known to be used in connection with transactions between users and nodes of the networks. In connection therewith, computer network transaction data is often collected and stored (e.g., by servers connected to the networks, etc.). The network transaction data may include location data for nodes involved in the network transactions, which may be expressed as latitudes and longitudes, postal codes, street addresses, etc. The network transaction data is often used to facilitate the network transactions, and further to provide evidence of the network transactions. Network transaction data is known to be relied upon in computer network analytics, whereby fraud prevention and security tools, for example, are produced and employed for future network transactions. The computer network transactions may also include a variety of network transactions, including, payment network transactions, corporate network transactions, gaming network transactions, building network transactions, transportation network transactions, etc. For example, payment network accounts are known to be used to fund payment network transactions with network nodes of merchants connected to a payment network, such that electronic authorization, clearing and settlement of the payment network transactions occur over the payment network, where payment network transaction data is collected and stored.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Network transaction data is collected and stored for computer network transactions. Depending on various factors, the network transaction data may be incomplete, as to, for example, locations of network nodes involved in the transactions. The location information may be filled in, for example, by converting specific locations, for example, street addresses of buildings in which the network nodes reside, into latitudes and longitudes for the network nodes. When the street addresses in which the network nodes reside are lacking street numbers, or street names, or city names (e.g., when they only include postal codes, etc.), determining and including the network node location data of the network nodes in the network transactions records is problematic.

As an example, a centroid or center of a region in which a network node belongs (e.g., as defined by a postal code, etc.) may be included in network transaction data as the location of the network node (when unknown). In this manner, a location is given for the network node. However, the location fails to take into account known information about other network nodes in the region, which in context of the present disclosure may allow for a better, more accurate estimation of the actual location of the network node. As can be appreciated, accurate estimations of the actual locations of network nodes connected to computer networks is important for a variety of reasons attendant to, for example, computer network analysis, security, maintenance, tracking, etc.

Uniquely, the systems and methods herein provide an estimated location of a network node, within a region, based on an aggregate of network node locations in the region. In particular, a location engine accesses network transaction records for a given region, which include reference network transaction records that include specific location data (e.g., latitude and longitude data, etc.). The reference network transaction records may further be filtered (e.g., by eliminating records outside of standard deviation(s), etc.) (e.g., to limit effects of outliers, etc.). Locations of the filtered reference network transaction records are then aggregated (e.g., to determine the median, etc.) and the aggregated network node location is then assigned, as appropriate, to transaction records for network nodes in the region not having specific locations indicated in the network transaction data associated therewith, as an estimated network node location.

In this manner, as network nodes are known to be clustered within a region, the location of other network nodes is factored into estimated locations for network nodes unassociated with specific locations in network transaction data. For example, network nodes associated with a corporate network may be more heavily clustered in a particular area of a region where corporations typically locate their offices (e.g., a downtown area, a business district, a financial district, etc.), while network nodes associated with a gaming network may be more heavily clustered in a particular area of a region that is more residential. As another example, network nodes associated with a payment network may be more heavily clustered in a particular area of a region that is a shopping district. The estimated network node locations (e.g., of merchant network nodes, etc.) based on specific known locations of other network nodes of the same type and/or associated with the same type of network (e.g., based on specific known locations of other merchant network nodes associated with a payment network, etc.), then, are more accurate than merely applying the geographic centroid of the regions of the network nodes.

Figure 1:
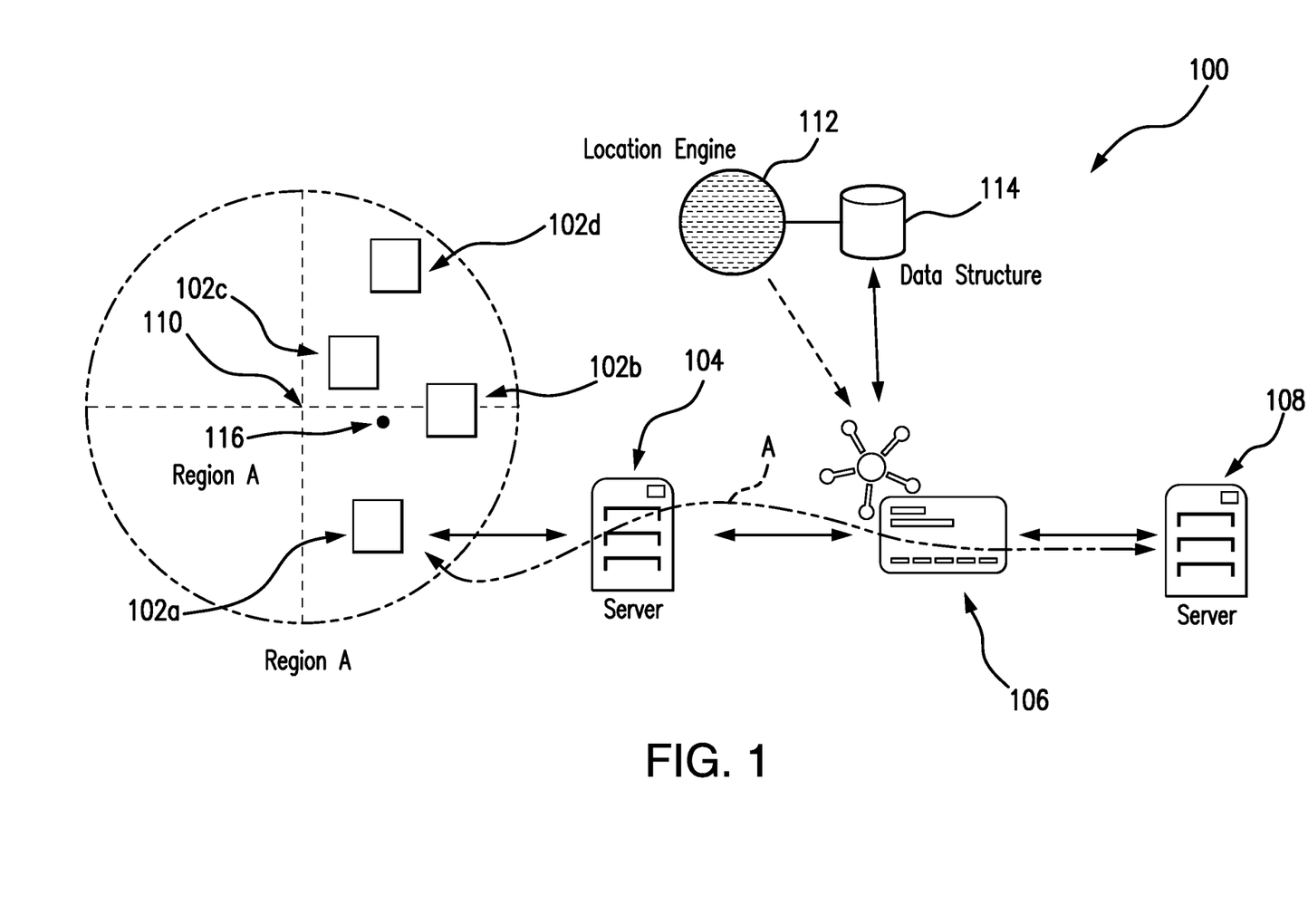
FIG. 1 is an exemplary system of the present disclosure suitable for use in assigning locations to network transaction records.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on processing of transactions, locations of merchants in regions, etc.

As shown in FIG. 1, the system 100 generally includes multiple merchants 102a-d, an acquirer 104 associated with the merchant 102a, a payment network 106, and an issuer 108, each coupled to (and in communication with) one or more networks. In connection therewith, each of the merchants 102a-d represents a network node associated with the payment network 106, such that each of the merchants 102a-d may be considered a network node, and whereby each of the network nodes represented thereby may be considered a merchant. With that said, the networks are illustrated by the arrowed lines in FIG. 1, and each may include, without limitation, one or more of a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, at least one of the networks includes multiple networks, where different ones of the multiple networks are accessible to different ones of the illustrated parts in FIG. 1. In this example, the network may include a private network made accessible by the payment network 106 to the acquirer 104 and the issuer 108 and, separately, a public network (such as the Internet) through which the merchant 102a connects to the acquirer 104.

In the system 100, the merchants 102a-d offer to sell products (e.g., goods, services, etc.) to consumers. The merchants 102a-d are associated with physical locations associated with respective network nodes (as represented by each of the merchants 102a-d). As shown in FIG. 1, for example, each of the network nodes represented by the merchants 102a-d is located within a region, referenced as Region A. In this example, Region A represents the boundaries of a postal code (e.g., a ZIP code, etc.) (broadly, a boundary identifier). As shown in FIG. 1, Region A defines roughly a circle shape, with a center or centroid designated as 110. Within Region A, each of the network nodes represented by the merchants 102a-d is disposed at a location, which is specific to a latitude and a longitude for the location. What's more, generally, the location of each network node represented by the merchants 102a-d is associated with a street address, which includes a number, a street name, a city name, and a state name (e.g., for the United States, etc.) and also the postal code.

When a consumer (not shown) arrives at a merchant, for example, merchant 102a (i.e., at the physical location thereof or, potentially, at a virtual location thereof), the consumer may decide to purchase a product. In connection therewith, the consumer presents a payment device (e.g., a credit card, virtual wallet, fob, etc.) to the network node represented by the merchant 102a. The network node represented by the merchant 102a then captures, reads, or otherwise receives/retrieves a payment account credential from the payment device (e.g., via a point of sale (POS) terminal, etc.). The network node represented by the merchant 102a is configured to then generate an authorization request for the purchase network transaction between the consumer and the network node represented by the merchant 102a and to transmit the authorization request to the acquirer 104, as indicated by path A in FIG. 1.

The authorization request generally includes information about the network node represented by the merchant 102a (and the merchant itself) and the network transaction between the consumer and the network node represented by the merchant 102a. For example, the authorization request may include a terminal ID for the POS terminal at the merchant 102a, a merchant ID for the merchant 102a, a merchant address for the merchant 102a (e.g., a street address or part thereof, etc.), a merchant category code (MCC) for the merchant 102a, an acquirer ID for the acquirer 104, an amount of the transaction, a payment account number for the consumer's payment account used in the transaction, an expiration date for the consumer's payment account device, a card verification code (CVC), a PIN used in connection with authenticating the consumer, etc.

Upon receipt, the acquirer 104 is configured to communicate the authorization request with the issuer 108 (as the issuer of the consumer's payment account) along path A through the payment network 106, such as, for example, through Mastercard®, VISA®, Discover®, American Express®, etc. The issuer 108 is configured to then determine whether the consumer's payment account is in good standing and whether there are sufficient funds and/or credit to fund the network transaction. If approved, an authorization reply, or response (indicating the approval of the transaction), is transmitted back from the issuer 108 to the network node represented by the merchant 102a (again along path A), thereby permitting the network node represented by the merchant 102a to complete the network transaction. The network transaction is later cleared and/or settled (via appropriate network transaction messages such as clearing messages and/or settlement messages, for example) by and between the merchant 102a, the acquirer 104, and the issuer 108 (by appropriate agreements). If the network transaction is declined, however, an authorization reply (indicating the decline of the transaction) is provided back to the network node represented by the merchant 102a (e.g., back to the POS terminal that captured, read, or otherwise received/retrieved the payment account credential from the payment device, etc.), thereby permitting the network node represented by the merchant 102a to halt or terminate the transaction, or request alternate funding.

Despite the above description being specific to the merchant 102a, it should be appreciated that transactions initiated at any of the network nodes represented by merchants 102b-d will be generally consistent with the above description (and will involve acquirers particular to the given merchants 102b-d and issuers particular to the payment accounts used in the given transactions). Moreover, while the acquirer 104, the payment network 106, and the issuer 108 are illustrated apart from Region A, it should be appreciated that these entities are not limited to any particular location and, in fact, may be located inside the Region A or outside of Region A, or inside another region (not shown). In general, it is the locations of the network notes represented by the merchants 102a-d in the Region A, which is germane to the present disclosure.

Network transaction data is generated, collected, and stored as part of the above interactions among the network nodes represented by the merchants 102a-d, the acquirer 104, the payment network 106, and the issuer 108. The network transaction data represents network transactions, and in particular network transaction records, where each network transaction is associated with a network transaction record. The network transaction data, in the exemplary system 100, is further segregated into authorization, clearing, and settlement data, with different network transaction data being generated for each. The network transaction data, in this exemplary embodiment, is stored at least by the payment network 106 (e.g., in a data structure associated with the payment network 106, etc.). Additionally, or alternatively, network transaction data may be transmitted among parts of the system 100 as desired and/or necessary. As used herein, network transaction data may include, for example (and without limitation), primary account numbers (PANs), transaction amounts, merchant IDs, merchant addresses (e.g., street addresses or parts thereof, etc.), MCCs, date/times of transactions, acquirer IDs, acquirer names, etc. It should be appreciated that more or less information related to network transactions, as part of either authorization or clearing and/or settling or other operations, may be included in network transaction records and stored within the system 100, for example, at the payment network 106 in a data structure associated therewith.

While only four merchants 102*a-d* (and the network nodes associated therewith), one Region A, one acquirer 104, one payment network 106, and one issuer 108 are illustrated in FIG. 1, it should be appreciated that a different number of these entities/parts of the system 100 may be included in other system embodiments. In addition, other merchants may be located in Region A in other embodiments, and/or other merchants may be located in other regions and still be subject to the disclosure herein.

Figure 2:
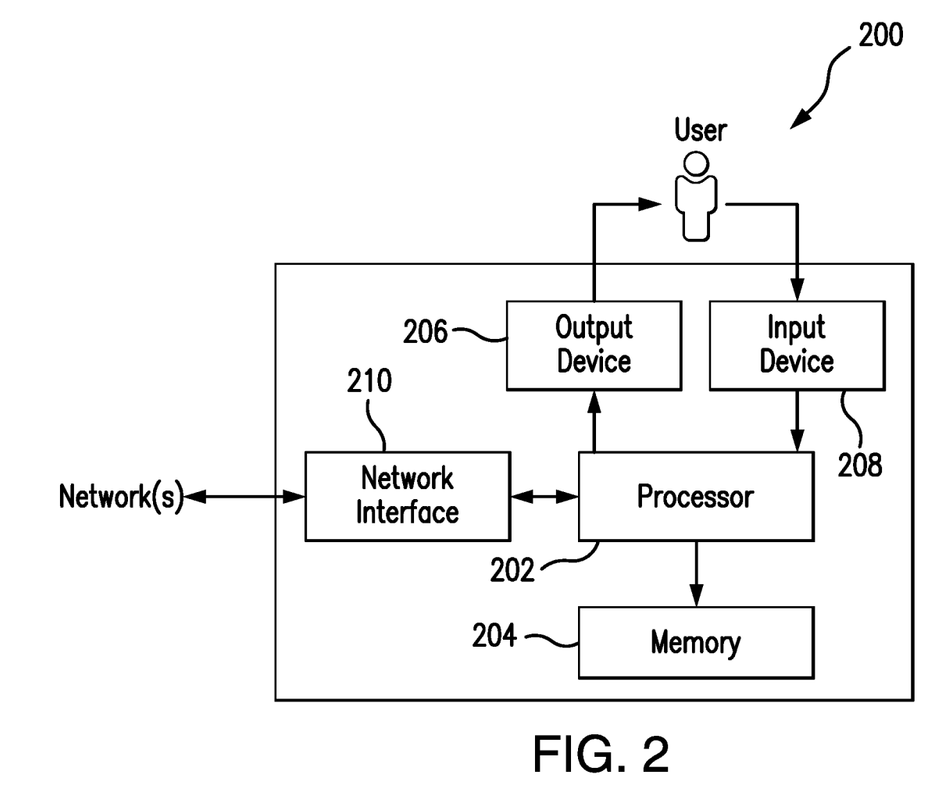
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, routers, personal computers, tablets, laptops, smartphones, POS terminals, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices. In the exemplary embodiment of FIG. 1, each of the merchants 102*a-d* (and the network nodes represented thereby), the acquirer 104, the payment network 106, and the issuer 108 may be considered as implemented in (and/or including) a computing device generally consistent with the computing device 200, where the computing device 200 is coupled to (and is in communication with) one or more of the networks.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, network transaction data, location information, region definitions and/or data, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes an output device 206 that is coupled to (and is in communication with) the processor 202. The output device 206 outputs data, for example, visually, audibly, etc., to a user of the computing device 200, such as, for example, the consumer (not shown), etc. It should be further appreciated that various interfaces (e.g., as defined by network-based applications, etc.) may be displayed at computing device 200, and in particular at output device 206, to display such information. The output device 206 may include, without limitation, a liquid crystal display (LCD), a light-emitting diode (LED) display, an LED, an organic LED (OLED) display, an "electronic ink" display, speakers, etc. In some embodiments, the output device 206 may include multiple devices.

The computing device 200 also includes an input device 208 that receives inputs from the user (i.e., user inputs). The input device 208 is coupled to (and is in communication with) the processor 202 and may include, for example, a keyboard, a pointing device, a mouse, a button, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

In addition, the illustrated computing device 200 further includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the networks illustrated by the arrowed lines in FIG. 1. Further, in some exemplary embodiments, the computing device 200 includes the processor 202 and one or more network interfaces (including the network interface 210) incorporated into or with the processor 202.

Referring again to FIG. 1, the system includes a location engine 112, which is configured by executable instruction to perform as described herein. The location engine 112 is illustrated as a standalone device in the system 100. As such, the location engine 112 is generally consistent with the computing device 200. That said, as indicated by the dotted line in FIG. 1, the location engine 112 may be included in whole or part in the payment network 106, for example, in one or more computing devices therein, or potentially in one or both of the acquirer 104 and the issuer 108.

The location engine 112 is coupled to a data structure 114, which includes network transaction data from multiple payment account network transactions. The data structure 114, like the location engine 112, is illustrated as a standalone device in the system 100, but may be incorporated with the location engine 112 and/or otherwise in the system 100. In this exemplary embodiment, when network transaction data is generated and/or stored, as described above, the payment network 106 stores the network transaction data in the data structure 114, as indicated by the arrowed line in FIG. 1. Each of the network transactions stored in the data structure 114 (e.g., specific to authorization, clearing, settlement, or a combination thereof, etc.) is represented by a network transaction record in the data structure 114 (as generally described above with respect to the exemplary transaction at the merchant 102a).

Table 1 includes a number of exemplary network transaction records from the data structure 114. As shown, the network transaction data is limited, generally, to certain parts/aspects of the network transaction, for example, primarily to a location of the network node represented by the merchant involved in the network transaction.

TABLE 1

| Network Transaction ID | Merchant/ Network Node ID | Merchant/ Network Node Postal Code | Latitude | Longitude |
|---|---|---|---|---|
| 0001 | 102a | 12345 | 42.809930 | −73.951460 |
| 0002 | 102c | 12345 | 42.813848 | −73.981755 |
| 0003 | 102a | 12345 | 42.809930 | −73.951460 |
| 0004 | 102a | 12345 | 42.809930 | −73.951460 |
| 0005 | 102c | 12345 | 42.813848 | −73.981755 |
| 0006 | 102b | 12345 | [Unknown] | [Unknown] |
| 0007 | 102d | 12345 | 30.545000 | −83.870200 |
| 0008 | 102d | 12345 | 30.545000 | −83.870200 |
| 0009 | 102c | 12345 | 42.813848 | −73.981755 |
| 0010 | 102d | 12345 | 30.545000 | −83.870200 |
| 0011 | 102d | 12345 | 30.545000 | −83.870200 |
| 0012 | 102a | 12345 | 42.809930 | −73.951460 |
| 0013 | 102a | 12345 | 42.809930 | −73.951460 |
| 0014 | 102c | 12345 | 42.813848 | −73.981755 |
| 0015 | 102b | 12345 | [Unknown] | [Unknown] |

As shown in Table 1, each of the network transaction records includes the same region designator, which in this embodiment includes a postal code (i.e., each includes the same merchant/network node postal code). In addition, each of the network transaction records for the network nodes represented by merchants 102a and 102c-d further includes a latitude and a longitude for the network node represented by the merchant. However, the latitude and longitude for the network transaction records involving the network node represented by merchant 102b are missing. As such, in the context of the present disclosure, the location engine 112 is configured to estimate a location, in latitude and longitude, for the missing data based on multiple other network transaction records, whereby the location engine 112 is then configured to assign the estimated location to the network transaction records for the network node represented by merchant 102b.

In particular, the location engine 112 is configured to access the network transaction records (from the data structure 114) for the network nodes represented by the merchants within Region A (as indicated by the region designator (e.g., the postal code, etc.)), which include latitudes and a longitudes. As shown above, this includes each transaction record associated with the network nodes represented by merchant 102a and 102c-d, as each includes the same postal code. These records are referred to as reference network transaction records. Conversely, the network transaction records for which the latitude and longitude are missing, i.e., the network transaction records involving the network node represented by merchant 102b, are referred to as target network transactions records.

The location engine 112 is further configured to, after accessing the reference network transaction records, optionally limit and/or filter the reference network transaction records in one or more manners. Specifically, for example, the location engine 112 may impose a threshold on the number of network nodes represented by the merchants in the given region (e.g., Region A in this example, etc.) (e.g., associated with the region designator, etc.) as reflected in the accessed network transaction records, prior to proceeding, to ensure at least a minimum number of network nodes represented by the merchants are represented by the reference network transaction records. The threshold may be any suitable number (e.g., three, five, ten, one hundred, one thousand, etc.).

Further, the location engine 112 is configured to determine a standard deviation of the locations (i.e., the latitudes and longitudes) of each network node reflected in the reference network transaction records and to eliminate locations, or reference network transaction records, that are outside of one standard deviation (or a different number of standard deviations) away from the median of the locations reflected in the reference network transaction records. In addition or in the alternative, in one or more other embodiments, the location engine 112 may be configured to impose a minimum number of merchants (as represented in the network transaction records) and/or minimum number of network transaction records to proceed to estimate the location of a merchant. That said, in one or more other embodiments, the location engine 112 may not be configured to limit and/or filter the accessed reference network transaction records at all, or may not otherwise impose a threshold on the number of network nodes, merchants, network transaction records, etc.

In any case, in the exemplary system 100, the location engine 112 is configured to limit and/or filter the reference network transaction records by imposing a threshold of three on the number of network nodes represented by the merchants in the region in the accessed data (such that the location engine 112 requires at least three network nodes, such that the location engine 112 requires no more than three network nodes, such that the location engine 112 requires exactly three network nodes etc.). With that in mind, in the exemplary system 100, the number of network nodes represented by the merchants 102a and 102c-d is three. As such, the number of network nodes in the system 100 (represented by the merchants 102a and 102c-d) satisfies the threshold imposed by the location engine 112.

Next, after the location engine 112 filters locations, or reference network transaction records, that are outside of one standard deviation, the location engine 112 is configured to determine an aggregate location based on the remaining reference network transaction records (e.g., aggregate location 116 in FIG. 1, etc.). In the illustrated embodiment, the location engine 112 is configured to determine the aggregate location as a median for the remaining reference network transaction records. That said, the location engine 112 may be configured to aggregate the remaining reference network transaction records, and specifically, the locations therein, in other manners, including, for example, as a mean, etc.

Regardless of the manner in which the aggregate location is determined, and as can be seen in FIG. 1, the aggregate location 116 of the network nodes represented by merchants 102a and 102c-d in Region A is more closely aligned with the actual location of the network node represented by merchant 102b than the centroid 110 of the Region A. With the systems and methods disclosed herein, as network nodes of merchants (and merchants themselves) are often clustered together in various regions (e.g., in retail districts, shopping centers, etc.), the aggregate location, based on the locations of other network nodes represented by other merchants in the given region is expected to be a more accurate estimate of the location of remaining merchants in the region (than a general centroid of the region).

In view of the above, it should be understood that the location engine 112 is configured, by executable instructions, to operate as described to determine an estimated location for a network node represented by a merchant in a region (where the merchant does not have an associated specific location), based on known locations of other network nodes represented by other merchants in the region. Exemplary instruction set excerpts, which may be included in the location engine 112, for determining such an estimated location (for a postal code), are provided below:

```
SELECT PostalCode,
MEDIAN(Latitude) LatitudeMedian, MEDIAN(Longitude) LongitudeMedian,
COUNT(*) NbrLocs
FROM (SELECT PostalCode,
Latitude,
Longitude,
COUNT(*) OVER (PARTITION BY PostalCode) cnt,
MEDIAN(Latitude) OVER (PARTITION BY PostalCode) LatMedian,
MEDIAN(Longitude) OVER (PARTITION BY PostalCode) LongMedian,
STDDEV(Latitude) OVER (PARTITION BY PostalCode) LatStdDev,
STDDEV(Longitude) OVER (PARTITION BY PostalCode) LongStdDev
FROM LocationTable
WHERE
AND
AND
)
WHERE cnt >= 3
AND Latitude >= LatMedian - LatStdDev
AND Latitude <= LatMedian + LatStdDevd
AND Longitude >= LongMedian - LongStdDev
AND Longitude <= LongMedian + LongStdDev
GROUP BY PostalCode
```

The exemplary instruction set excerpts utilize the Oracle® analytics functions in the inner SELECT instruction set to, for each region, return each particular network node (as represented, here, by a merchant) within the region (here, as defined by a postal code), as reflected in the reference network transaction records, along with the median and standard deviation of the latitude and longitude for the other returned network nodes (as represented by the merchant) within the region. The instruction set excerpts then utilize the Oracle® analytics functions in the outer SELECT instruction set to recalculate the median and standard deviation for the network nodes in each region (here, as defined by a postal code), where there are at least three network nodes reflected in the reference network transaction records, excluding network nodes (as represented by merchants) with a latitude or longitude more than one standard deviation from the median calculated for the region in the inner SELECT instruction set. The recalculated median latitude and longitude for each region, then, may serve as an estimate or aggregate location for any network nodes (or merchants) appearing in network transaction records that are lacking a specific location (including target reference network transaction records). It should be appreciated that the above executable instructions are exemplary only, and that other executable instructions may be provided to program the location engine 112 consistent with the description herein.

Finally in the system 100, when the estimated or aggregate location is determined, the location engine 112 is configured to then assign the estimated location to the network node represented by the merchant 102b. What's more, the location engine 112 may be configured to determine the estimated location at one or more irregular intervals (e.g., monthly, quarterly, etc.), or as scheduled or instructed from a user, for either a single region (e.g., a selected region, etc.), for each region, or a subset of regions, etc. As such, the location engine 112 is configured to include the estimated location, for a given region, which is up to date and available to be assigned to each network transaction record representing a network transaction between a user (e.g., a consumer with a network account (e.g., a payment account, etc.), etc.) and a network node (e.g., represented by a merchant, etc.) of the given region, where the network transaction record is without latitude and/or longitude of the network node involved in the network transaction record, and without sufficient address information to determine the latitude and/or longitude.

Figure 3:
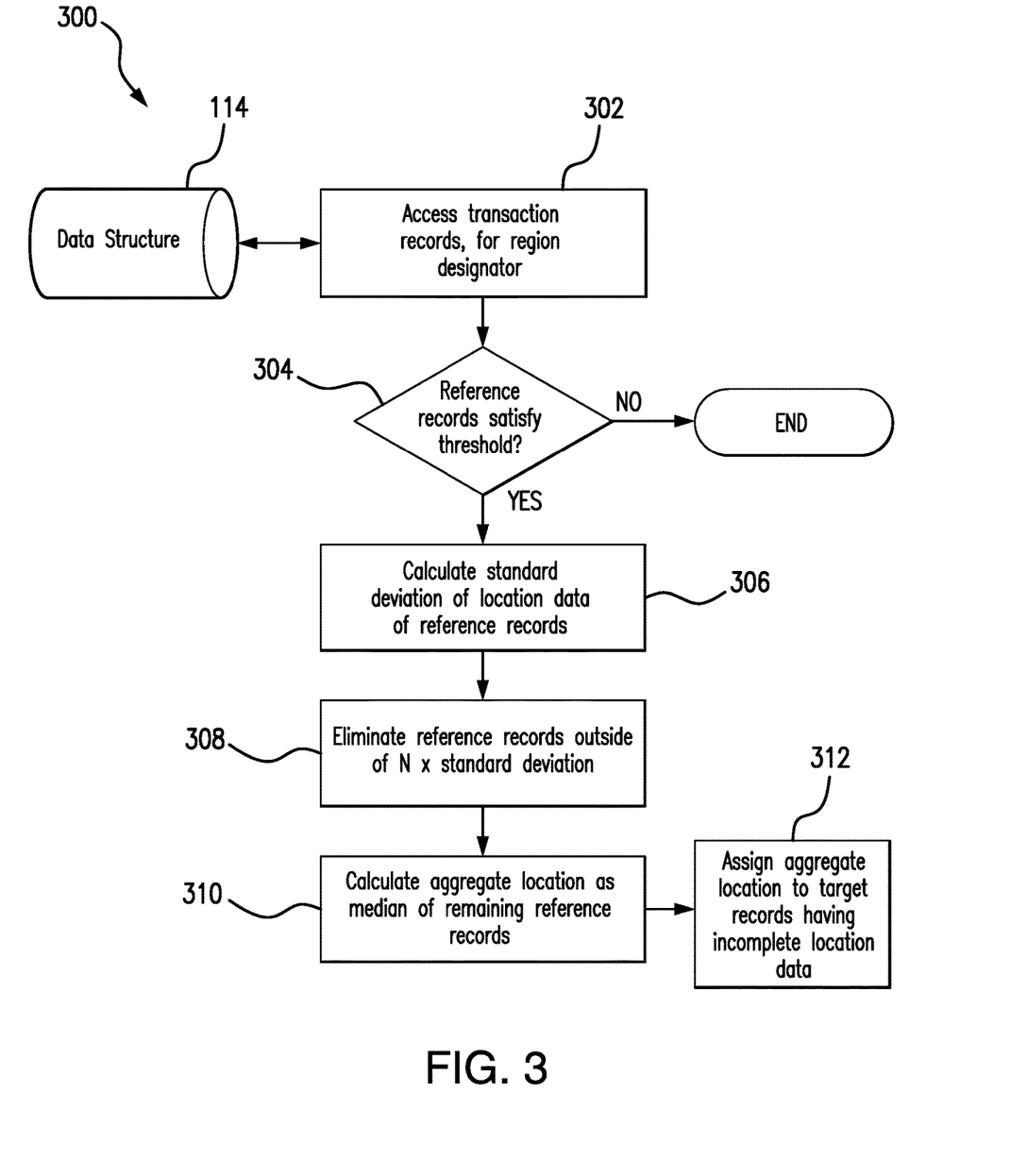
FIG. 3 is an exemplary method for use in assigning a location to a network transaction record, in a region, based on locations of other network transaction records in the region, and which is suitable to be implemented in the system of FIG. 1.

FIG. 3 illustrates an exemplary method 300 for use in assigning a location to a network transaction record, in a region, based on the locations of other network transaction records in the region. The method 300 is described with reference to the system 100 of FIG. 1, and in particular to the location engine 112, etc., and to the computing device 200 of FIG. 2. The methods described herein (including the method 300), however, should not be considered to be limited to the system 100, or the computing device 200. Likewise, the systems and devices herein should not be considered to be limited to the method 300.

Generally in the method 300, the data structure 114 includes the network transaction records described above with reference to Table 1. The network transaction records include target network transaction records, which include incomplete location data for the network nodes/merchants involved in the network transactions represented by the target network transaction records (i.e., for merchant 102b), and reference network transaction records, which include complete location data (i.e., latitudes and longitudes, or equivalents thereof) for the network nodes/merchants involved in the network transactions represented by the reference network transaction records (i.e., for merchants 102a and 102c-d). For each of the target network transaction records, representing a network transaction between a user/consumer and a network node (as represented by a merchant) in a single region (e.g., as defined by a postal code, etc.), the location engine 112, through method 300, estimates a location to be added to the network transaction record or otherwise associated therewith.

In connection therewith in the method 300, the location engine 112 initially accesses, at 302, reference network transaction records, from the data structure 114, which include the same postal code, or more generally, the same region designator (as the target network transaction records). It should be appreciated that the region designator may include a city, an area code, a street name, or other data indicative of a region or boundary. For example, where a city and postal code are known for a target network transaction record, which is missing latitude and longitude location data, the location engine 112 may access all network transaction records having the same city and postal code. Likewise, when a street name is known, the location engine 112 may access all network transaction record having the same street name (and city and/or postal code where also available, etc.). As such, the locations engine 112 limits the reference network transaction records to only those consistent with the target network transaction records that are to be completed with specific location data (e.g., latitude and longitude location data, etc.).

With reference to Table 1, the location engine 112 accesses all of the reference network transaction records which include a postal code of 12345 (as the region designator). In so doing, the location engine 112 accesses thirteen different reference network transaction records for postal code 12345.

Next in the method 300, the location engine 112 determines, at 304, whether the number of network nodes represented by the merchants, as reflected in the accessed reference network transaction records, satisfies a threshold number of network nodes (or merchants) (broadly, determines whether the reference records satisfy a threshold). In the example of Table 1, the threshold is three network nodes/merchants, which is satisfied by the reference network transaction records and, in particular, by each of the three network nodes represented by merchant 102a, merchant 102c, and merchant 102d, respectively, in the reference network transaction records. It should be appreciated that the threshold may be different in other embodiments, including, without limitation, four, five, ten, or another suitable number of network nodes (or merchants) included in the records. If the threshold is not satisfied, the method 300 ends.

When the threshold is satisfied, as in the example of Table 1, the location engine 112 calculates, at 306, a standard deviation for the location data for the network nodes (as represented by the merchants) included in the reference network transaction records. To do so, the location engine 112 initially identifies, based on the accessed reference network transaction records, the latitude and the longitude for each network node/merchant included in the accessed reference network transaction records. The location engine 112 then determines, in this example, a median of the identified latitudes for the network nodes/merchants included in the accessed reference network transaction records, and a median of the identified longitudes for the network nodes/merchants included in the accessed reference network transaction records. And, for each of the identified latitudes/longitudes for the network nodes/merchants 102a and c-d, the location engine 112 determines the standard deviation by: (a) determining a difference by subtracting the median of the identified latitudes/longitudes from the corresponding latitudes/longitudes; (b) determining the square of each difference, and summing the differences of the squares for the respective latitudes/longitudes; (c) dividing the sum by the number of the different network nodes/merchants 102a and c-d represented in the reference network transaction records (i.e., three in the example of Table 1) minus one (for a sample standard deviation); and (d) taking the square root of that number to determine the sample standard deviation for the latitude/longitude location data.

In the example of Table 1, the location engine 112 initially identifies (for each of the three merchants 102a and c-d associated with the accessed reference network transaction records) a latitude of 42.809930 and a longitude of −73.951460 for merchant 102a; a latitude of 42.813848 and a longitude of −73.981755 for merchant 102c; and a latitude of 30.545000 and a longitude of −83.870200 for merchant 102d. The location engine 112 then determines the median of the latitudes for the three identified network nodes/merchants 102a and c-d to be 42.809930. Similarly, the location engine 112 determines the median of the corresponding longitudes for the three identified network nodes/merchants 102a and c-d to be −73.981755. Then, for each of the identified latitudes for the network nodes/merchants 102a and c-d, the location engine 112 determines the sample standard deviation for the latitude values to be 7.082291937, and the sample standard deviation for the longitude values to be 5.71786186.

That said, in one or more other embodiments, a population standard deviation may be determined (instead of or in addition to the sample standard deviation), such that the sum is divided by the total number of different network nodes/merchants represented in the reference network transaction records (as opposed to the total number of different network nodes/merchants minus one). Further, in one or more other embodiments, the standard deviation may be determined based on values for each of the network transactions (whereby location data for all of the network transactions are taken into account, instead of just for the particular nodes/merchants involved).

Then in the method 300, the location engine 112 eliminates, at 308, the reference network nodes/merchants (and associated network transaction record(s)) with latitude or longitude location data which falls outside of N times the standard deviation (broadly, eliminates reference network transactions records that fall outside of N times the standard deviation). For instance, in the above example of Table 1, N may be 1.0. As such, reference network transaction records for network node/merchant 102d are eliminated (at 308). It should be appreciated that any desired number of standard deviations may be used to eliminate reference transaction records in other embodiments (e.g., other than 1, etc.), as desired to achieve particular results, etc. What's more, other method embodiments may omit the standard deviation and rely on other mechanisms to prevent the calculations from being based on incorrect data (e.g., dirty data, etc.). In the example of Table 1, network node/merchant 102d may have been associated with postal code 12345 in error, whereby its actual postal code may be 32345, and, as such, would not be useful in determining an estimate or aggregate location for network node/merchant 102b (which is actually in postal code 12345). The standard deviation as used herein allows the location engine 112 to eliminate data outliers that suggest an error in the data, such as the latitudes and longitudes in the example of Table 1, that do not actually fall within the region (e.g., the postal code 12345, etc.) associated with the reference network transactions records.

In turn, the location engine 112 calculates an aggregate location, including a latitude and a longitude, as a median of the latitudes and longitudes of the remaining network nodes/ merchants, at 310. With reference again to the example of Table 1, the aggregate location (based on the median of the latitudes and longitudes of the remaining network nodes/ merchants 102a and c) is determined to have a latitude of 42.811889 and a longitude of −73.9666075. With that said, it should be understood that a different aggregate for the remaining network nodes/merchants, such as a mean or mode, etc., may be determined in other method embodiments.

What's more (and as generally described above in connection with the standard deviation calculation), in one or more embodiments, the aggregate location (e.g., the median location, etc.) may be determined based on each reference network transaction record (and each latitude and longitude data point included therein), such that, for example, in the case of Table 1, the same latitude and longitude data points for network nodes/merchants 102a and c are considered multiple times in calculating the aggregate location. In these embodiments, this serves as a weighting, where the specific locations of network nodes/merchants with higher transaction volumes (as indicated by greater numbers of reference network transaction records for the network nodes/merchants) are more heavily factored into the aggregate location calculation (as opposed to specific locations for network nodes/merchants with lower transaction volumes (as indicated by lower numbers of reference network transaction records for the network nodes/merchants). In the example of Table 1, there are a greater number of reference network transaction records for network node/merchant 102a than for network node/merchant 102c. As such, in this example (taking into account this alternative approach), the latitude and longitude for the network node/merchant 102a would be more heavily weighted in calculating the aggregate location.

With reference again to FIG. 3, once the median, or more broadly, aggregate location, is determined, the locations engine 112 assigns, at 312, the aggregate location to the target network transaction records having the same region designator as the reference network transaction records, but where the target network transaction records have incomplete location data. Here, in the example of Table 1, each of target network transaction records 0006 and 0015, which involved network nodes/merchant 102b, are assigned with the aggregate location (e.g., the median). Thereafter, each of the network transaction records for network transactions in the region defined by postal code 12345 may be employed in one or more other operations and/or tools associated with the payment network 106 (e.g., fraud prevention algorithms, etc.), for example, which rely on the locations of each of the network nodes/merchants represented in the network transaction records, including the aggregate locations.

It should be appreciated that method 300 may be performed with respect to a single region or boundary, or may be repeated for each region or boundary (e.g., each postal code, etc.) in a group of regions or boundaries (e.g., each region making up a country or any other boundary, etc.) or for a set of regions or boundaries within a group of regions or boundaries. It should also be appreciated that the method 300 may be performed and/or repeated at one or more irregular intervals (e.g., monthly, quarterly, etc.), or as scheduled or instructed from a user.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by (a) accessing, by a computing device, multiple network transaction records for a region, the multiple network transaction records including a target record in which location data is missing for a merchant associated with the target record and multiple reference records in which location data is included for merchants associated with the reference records, the location data included in the multiple reference records indicative of a location within the region; (b) determining, by the computing device, that a number of the multiple accessed network transaction records satisfies a threshold; (c) generating, by the computing device, a standard deviation for the location data of the multiple reference records; (d) eliminating one or more of the multiple reference records in which the location data of the one or more of the multiple reference records is outside of at least one of the standard deviation; (e) determining, by the computing device, an aggregate location of the location data for the merchants associated with the multiple reference records; and (f) assigning, by the computing device, the aggregate location to the target record as location data for the merchant associated with the target record.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in assigning a location to a network node, the system comprising:
   a processor communicatively coupled to a memory, the memory including a data structure and the data structure including a plurality of records, the plurality of records each indicative of a network node and representative of a network transaction at the network node, the plurality of records each including a network node identifier specific to the network node indicated in the record and a boundary identifier; and
   wherein the processor is configured, for each common boundary identifier included in the plurality of records, to:
      access each of the plurality of records including the boundary identifier, the plurality of accessed records including multiple reference records and at least one target record;
         wherein the multiple reference records each further include location data for the network node indicated in the reference record, wherein the location data is indicative of a location of the network node indicated in the reference record within a region specific to the boundary identifier, and wherein multiple of the network node identifiers included in the multiple reference records are indicative of different networks nodes; and
         wherein location data for the network node indicated by the at least one target record is absent from the at least one target record;
      determine an aggregate location of the network nodes of the multiple reference records based on the location data included in the multiple reference records, thereby estimating a location of the network node of the at least one target record; and
      assign the aggregate location to the at least one target record as the location data indicative of the location of the network node identified in the at least one target record within the region.

2. The system of claim 1, wherein the boundary identifier for each of the plurality of accessed records includes a postal code for the region.

3. The system of claim 2, wherein the processor is further configured, for each common boundary identifier included in the plurality of records, to:
   calculate a standard deviation of the location data of the multiple reference records; and
   eliminate ones of the multiple reference records in which the location data for the reference record is outside of at least one of the standard deviation, prior to determining the aggregate location of the network nodes included in the multiple reference records.

4. The system of claim 2, wherein the processor is configured, in connection with determining the aggregate location of the network nodes included in the multiple reference records, to calculate a median of the location data for the network nodes.

5. The system of claim 4, wherein the location data includes a longitude and a latitude for each of the multiple reference records; and
   wherein the aggregate location includes a latitude and a longitude.

6. The system of claim 2, wherein the boundary identifier for each of the plurality of accessed records further includes at least one of a street and a city.

7. The system of claim 1, wherein, for each of the plurality of records, the network node identifier is associated with a merchant involved in the network transaction represented by the record.

8. A computer-implemented method for assigning location data to at least one target record, when the at least one target record lacks location data, the method comprising, for each common boundary identifier included in multiple reference records:
   accessing, by a computing device, each of a plurality of records including the boundary identifier, the plurality of accessed records including multiple reference records and at least one target record;
      wherein the multiple reference records each further include location data for a network node indicated in the reference record, wherein the location data is indicative of a location of the network node indicated in the reference record within a region specific to the boundary identifier, and wherein multiple network node identifiers included in the multiple reference records are indicative of different networks nodes; and
      wherein location data for the network node indicated by the at least one target record is absent from the at least one target record;
   determining, by the computing device, an aggregate location of the network nodes of the multiple reference records based on the location data included in the multiple reference records, thereby estimating a location of the network node of the at least one target record; and
   assigning, by the computing device, the aggregate location to the at least one target record as the location data indicative of the location of the network node identified in the at least one target record within the region.

9. The method of claim 8, further comprising determining, by the computing device, that a number of the accessed records satisfies a threshold, prior to determining the aggregate location.

10. The method of claim 8, further comprising, prior to determining the aggregate location:

generating, by the computing device, a standard deviation for the location data of the multiple reference records; and eliminating one or more of the multiple reference records in which the location data of the one or more of the multiple reference records is outside of at least one of the standard deviation.

11. The method of claim 8, wherein the location data included in the multiple reference records includes a longitude and a latitude; and wherein the aggregate location includes a latitude and a longitude.

12. The method of claim 11, wherein the region of each of the plurality of accessed records is defined by a postal code.

13. A non-transitory computer readable storage media comprising computer-executable instructions for assigning location data to at least one target record, when the at least one target record lacks location data, that when executed by at least one processor, cause the at least one processor to, for each common boundary identifier included in multiple reference records:

access each of a plurality of records including the boundary identifier, the plurality of accessed records including multiple reference records and at least one target record;

wherein the multiple reference records each further include location data for a network node indicated in the reference record, wherein the location data is indicative of a location of the network node indicated in the reference record within a region specific to the boundary identifier, and wherein multiple network node identifiers included in the multiple reference records are indicative of different networks nodes; and wherein location data for the network node indicated by the at least one target record is absent from the at least one target record;

determine an aggregate location of the network nodes of the multiple reference records based on the location data included in the multiple reference records, thereby estimating a location of the network node of the at least one target record; and assign the aggregate location to the at least one target record as the location data indicative of the location of the network node identified in the at least one target record within the region.

14. The non-transitory computer readable storage media of claim 13, wherein the instructions, when executed by the at least one processor, cause the at least one processor, in connection with determining the aggregate location based on the location data for the network nodes included in the accessed reference records, to determine the aggregate location as one of a median, a mean, or a mode of the location data for the network nodes of the accessed reference records.

15. The non-transitory computer readable storage media of claim 13, wherein the instructions, when executed by the at least one processor, further cause the at least one processor to determine that a number of the multiple reference records satisfies a threshold, prior to determining the aggregate location.

16. The non-transitory computer readable storage media of claim 13, wherein the instructions, when executed by the at least one processor, further cause the at least one processor, prior to determining the aggregate location, to:

generate a standard deviation for the location data of the multiple reference records; and eliminate one or more of the multiple reference records in which the location data is outside of at least one of the standard deviation.

17. The non-transitory computer readable storage media of claim 13, wherein the location data included in the multiple reference records includes a longitude and a latitude; and wherein the aggregate location includes a latitude and a longitude.

18. The non-transitory computer readable storage media of claim 13, wherein the boundary identifier includes a postal code for the region.

19. The non-transitory computer readable storage media of claim 18, wherein the boundary identifier further includes at least one of a street and a city.

\* \* \* \* \*